March 15, 1960 F. P. FORBATH ET AL 2,928,938

COMPUTER REGISTER

Filed July 23, 1954 2 Sheets-Sheet 1

INVENTORS.
FRANK P. FORBATH,
JAY M. HANSEN,
BY Henry Heyman
ATTORNEY.

COMPUTER REGISTER

Filed July 23, 1954 2 Sheets-Sheet 2

INVENTORS.
FRANK P. FORBATH,
JAY M. HANSEN,
BY
Henry Heyman
ATTORNEY.

2,928,938

COMPUTER REGISTER

Frank P. Forbath, North Hollywood, and Jay M. Hansen, Santa Monica, Calif., assignors to Hughes Aircraft Company, Culver City, Calif., a corporation of Delaware Application July 23, 1954, Serial No. 445,270

1 Claim. (Cl. 250—27)

This invention relates to electronic computers, and more particularly to an improved register for use in voltage-state digital computers.

Computer registers, such as circulating type registers, employ means to delay input signal pulses a predetermined amount before feeding them to an output circuit. To obtain the required delay, prior art registers for voltage-state computers generally employ a plurality of tube registers comprising flip-flop and gate circuits. The digital information is stored in the flip-flops, from which the gates effect its transfer to an output circuit. When a register must handle a large number of digits, the number of tube registers required becomes unduly multiplied and the overall efficiency of the register is lowered. Further, the high power requirements for such complex circuits means that individual registers are rather expensive and bulky.

It is an object of this invention to provide an improved register for voltage-state digital computers for accurately delaying input digital information.

It is another object of this invention to provide an improved register for voltage-state computers, wherein delays for input digital information are obtained with higher efficiency and with a smaller number of component parts than heretofore known.

It is a further object of this invention to provide a circulating register for use in voltage-state computers which comprises a relatively small number of component parts of simple design which have less space and power requirements than such registers of the prior art.

In accordance with a preferred embodiment of this invention, an ultrasonic acoustic delay line is energized at its resonant frequency by a pulsed oscillator. Electrical signals converted from the delay line are delayed a predetermined amount with respect to the signals from the external source. The delayed signals are amplified and applied through a network of gates to an output flip-flop. The gates contribute an additional predetermined delay for signals passed by the output flip-flop. The combined delays contributed by both the delay line and the network of gates is that required for the particular register.

The novel features which are believed to be characteristic of this invention, both as to its organization and method of operation, together with further objects and advantages thereof, will be better understood from the following description considered in connection with the accompanying drawings which are made part of this specification. The scope of the invention is pointed out in the appended claim. In the drawing, Fig. 1 is a block diagram of a computer register, in accordance with this invention;

Figure 1:
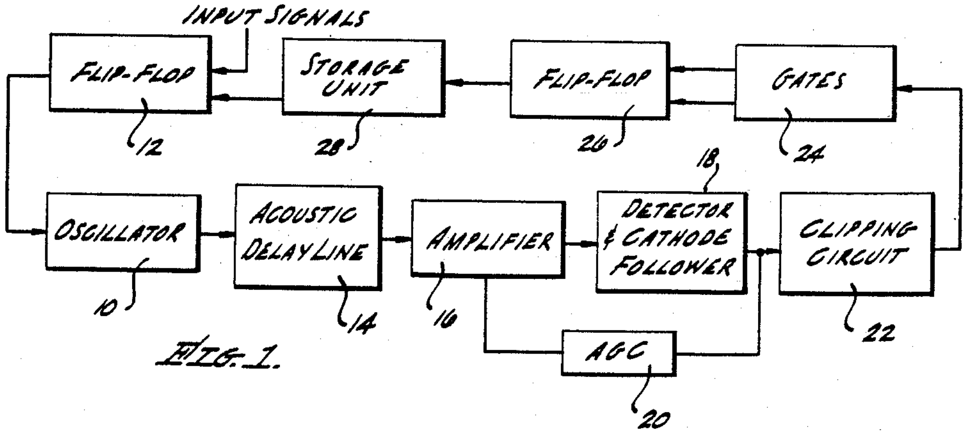

Referring to Fig. 1, an oscillator 10 is adapted to receive signal information from a flip-flop 12. An acoustic delay line 14 is coupled to oscillator 10. The frequency of the output wave from oscillator 10 is at the resonant frequency of delay line 14, which preferably is in the ultrasonic range. The output of delay line 14 is coupled through an amplifier 16 to a detector and cathode follower circuit 18. An automatic gain control (AGC) circuit is connected between the cathode follower and amplifier 16. The cathode follower is also connected to a clipping circuit 22, the output of which is connected to a network of gates 24. An output flip-flop 26 is connected between gates 24 and a storage unit 28.

Figure 2:
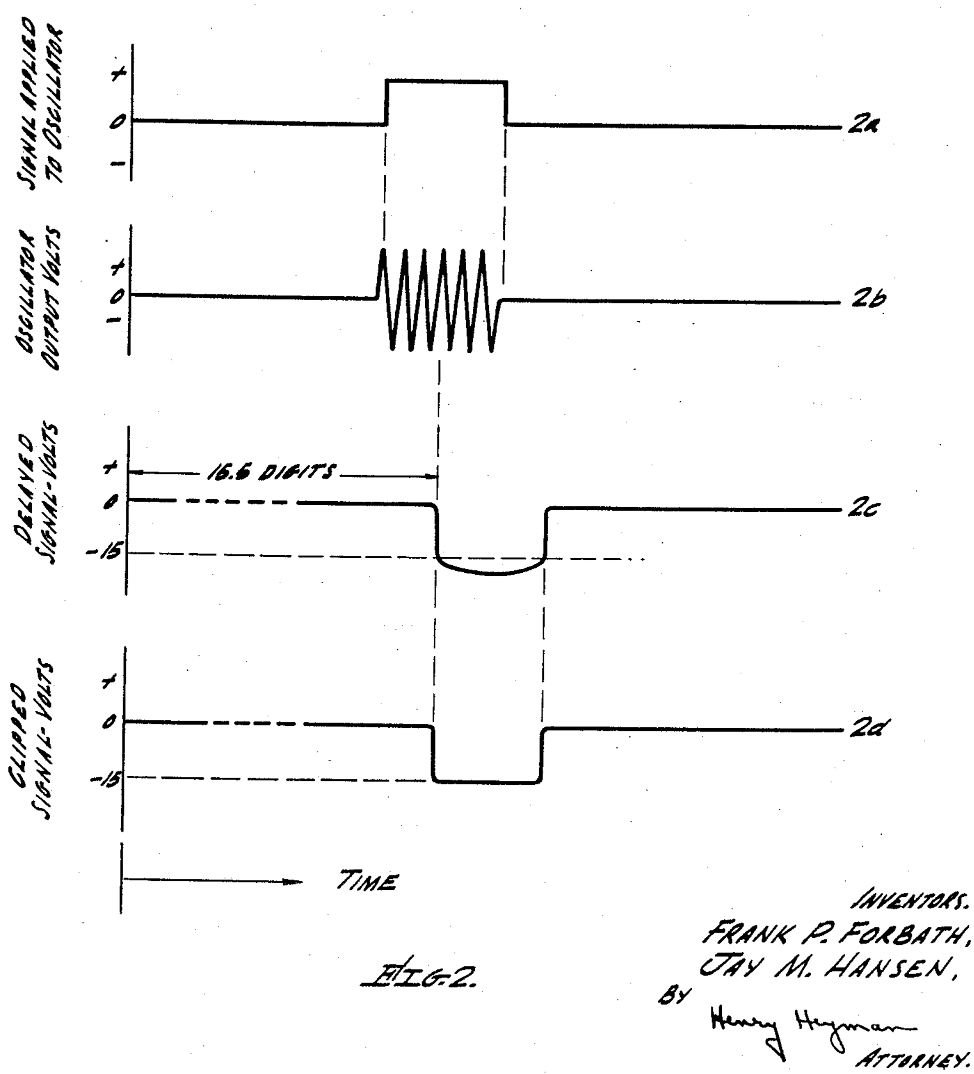
Fig. 2 illustrates waveforms useful in explaining the operation of the register of Fig. 1.

The operation of the above system will now be explained with reference to Fig. 2. Flip-flop 12 responds to input signals to apply to the oscillator 10 signals which extend over one or more digit times. It will be assumed that the output of flip-flop 12 is a signal covering one digit (Fig. 2*a*) and is to be delayed a predetermined amount with respect to the output of oscillator 10 (Fig. 2*b*). The output of oscillator 10 is amplified and detected, and the effect of delay line 14 is to cause the detected signal to be delayed by the desired amount with respect to the oscillator output. Preferably, delay line 14 is effective to provide a delay which is a half digit less than the total delay required. For example, where a total 16-digit delay is required, delay line 14 causes the detected signal to be delayed 15.5 digits (Fig. 2*c*).

The detected signal is applied through the cathode follower to AGC circuit 20 and clipping circuit 22. AGC circuit 20 may be of the conventional type which is provided with a long time constant relative to the period between pulses; this insures that unwanted signals will be substantially eliminated. AGC circuit 20 is adapted to be operated only upon the detected signals exceeding a predetermined magnitude, and clipping circuit 22 is adapted to pass only those portions of the detected signals which do not exceed the same magnitude. Preferably, amplifier 16 is adapted to insure that the magnitude of the detected signals, in the presence of signals from flip-flop 12, will slightly exceed such level. For example, the AGC and clipping levels may be a selected negative voltage, such as −15 v. (Fig. 2*c*). Amplifier 16 is adapted to amplify the signals from delay line 14 so that the detected signals fall below −15 v.; for example, the detected signal may be −20 v. in which case effective AGC action is assured. Further, clipping action is assured and the output from clipping circuit 22 (Fig. 2*d*) is a substantially rectangular signal.

Gates 24 further delay the signal from clipping circuit 22 to effect an output signal from flip-flop 26, which is a replica of the signal from flip-flop 12 but delayed the required total number of digits. In the example above mentioned, where delay line 14 effects a 15.5-digit delay for the detected signal with respect to the signal from flip-flop 12, the gates 24 effect the half digit delay required to provide the 16-digit total delay. The delayed signal from flip-flop 26 may be stored in unit 28, or, in the alternative, the above described system may be operated as a circulating register, in which case storage unit 28 is connected to the input of flip-flop 12 so that the delayed information is passed back to flip-flop 12.

It has been found that the use of acoustic delay line 14 is uniquely adapted to provide precise delays for signal pulses converted into an oscillatory wave as above described. Any suitable type of delay line may be employed and may include, for example, quartz, mercury, or metal delay lines.

Figure 3:
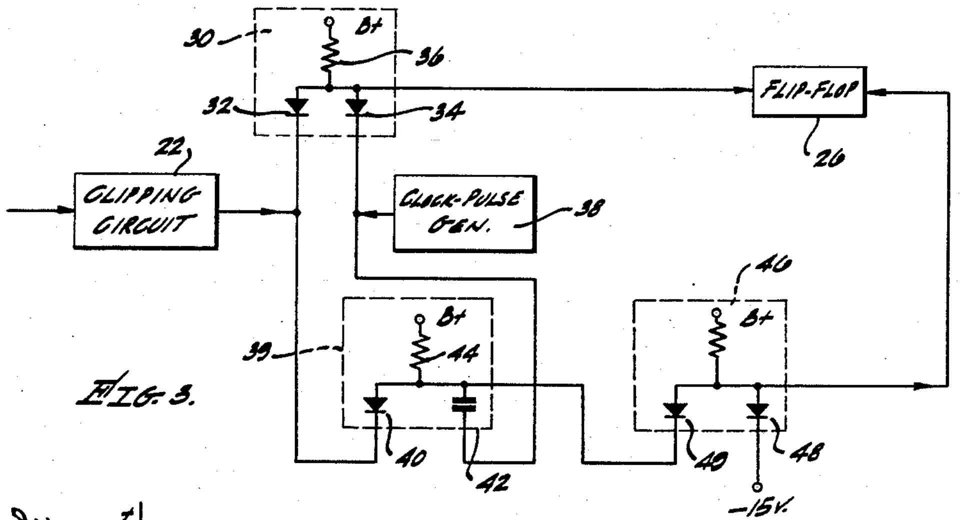
Fig. 3 is a combined block and circuit diagram of a portion of the register of Fig. 1.
Figure 4:
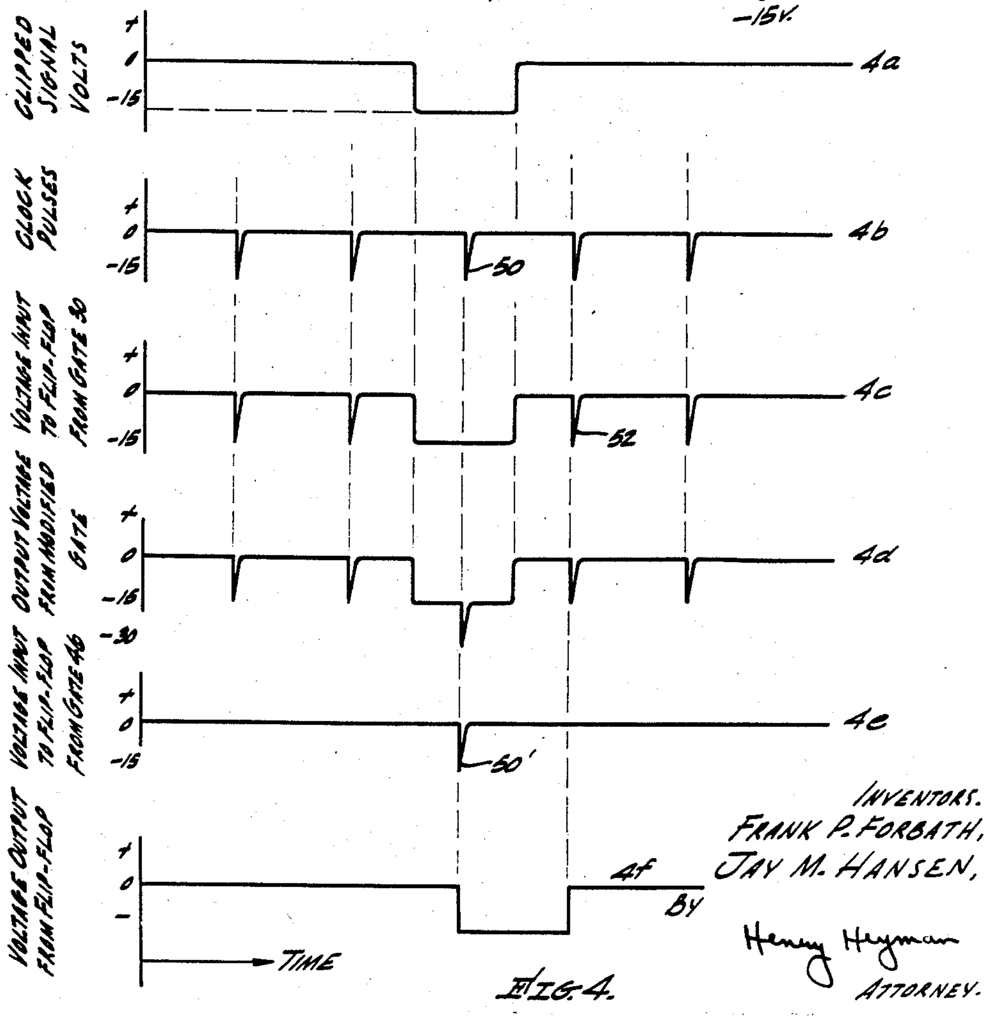
Fig. 4 illustrates waveforms to aid in explaining the operation of the combination shown in Fig. 3.

As previously mentioned, gates 24 contribute to the delay of the delay line 14. How this is accomplished will now be explained with reference to Figs. 3 and 4. Referring to Fig. 3, a gate circuit 30 is a conventional "and" gate employing a pair of diodes 32, 34 having their anodes connected through a plate resistor 36 to the positive terminal B+ of a voltage supply source (not shown). The output of clipping circuit 22 is applied to the cathode of one diode 32. The cathode of the other diode 34 is connected to the output of a clock-pulse generator 38. The output of clipping circuit 22 is shown in Fig. 4*a*, and is the same as that described in connection with Fig. 2*d*. The clock pulses (Fig. 4*b*) occur once every digit time and are so spaced that one clock pulse 50 occurs substantially at the center of the signal pulse from the clipping circuit. Further, in line with the exemplary values above mentioned, assume the clock pulses to be −15 v. pulses with respect to a reference or zero level, such as ground.

In the absence of both clock and signal pulses, the cathodes of diodes 32, 34 are at a reference potential, such as 0 volts, and the output to flip-flop 26 is constant at a reference or zero level. During the occurrence of a clock pulse, and while the signal from clipping circuit 22 is at 0 volts, the cathode of diode 34 is momentarily placed at −15 v., whereupon diode 34 conducts and effects a sharp, −15 v. pulse output to flip-flop 26. Upon the occurrence of the leading edge of the signal from clipping circuit 22, and in the absence of a clock pulse, the cathode of diode 32 is placed at a −15 v. potential; diode 32 conducts to cause an output signal to be applied to flip-flop 26 which is 15 v. negative with respect to the reference or 0 voltage level (Fig. 4*c*). When clock pulse 50 occurs during the low amplitude portion of the signal from the clipping circuit, the cathode of diode 34 is momentarily placed at the same negative potential as that of diode 32; however, this momentary change has substantially no effect on the output signal from gate 30. Upon the occurrence of the trailing edge of the signal from the clipping circuit, the cathode of diode 32 is returned to 0 volts, and the output signal from gate 30 returns to its reference or 0 level.

The output of the clipping circuit is also applied to a modified "and" gate 39. Gate 39 is modified in that it contains only one diode 40, and the other diode is replaced by a capacitor 42. One plate of capacitor 42 and the anode of diode 40 are connected through a plate load resistor 44 to B+. The other plate of capacitor 42 is connected to clock pulse generator 38, and the output of the clipping circuit 22 is applied to the cathode of diode 40. The effect of capacitor 42 is that clock pulses are transferred to the anode end of plate load resistor 44 to add to the voltage changes effected by the signal from the clipping circuit. Thus, and referring to Fig. 4*d*, the output from gate 39 appears as a composite signal made up of both the clock pulses and the signal from the clipping circuit, so that clock pulse 50 adds to the signal from the clipping circuit to provide a momentary output signal of −30 v.

The output signal from gate 39 is applied to a further "and" gate 46. Gate 46 is of the same conventional construction as gate 30, except that the cathode of one diode 48 is connected to a negative D.-C. source. Using values commensurate with those previously exemplified, the cathode of diode 48 preferably is maintained at −15 v. The output from gate 39 is applied to the cathode of the other diode 49. Because the cathode of diode 48 is clamped at −15 v., output signals from gate 46 will reflect only that portion of the composite signal applied to diode 49 which is less than −15 v. Accordingly, and referring to Fig. 4*e*, the output from gate 46, in the present example, will consist of a single −15 v. pulse 50'.

Flip-flop 26 is a conventional type which has two stable states, and which is adapted to switch from one state to the other under control of negative signals applied to both sides. With reference to the signal from gate 30 (Fig. 4*c*), it may be assumed that the pulses have already placed one side of the flip-flop in the nonconductive state, in which case the other side is conducting and the output of the flip-flop is high, i.e., at the zero level. The state of operation of the flip-flop will be changed only when a negative signal is applied to its other side, and this occurs with the negative pulse 50' of Fig. 4*e*. The output from the flip-flop becomes low with the occurrence of pulse 50' and remains low until the occurrence of the next succeeding negative pulse 52 of the signal applied from gate 30 (Fig. 4*c*). Pulse 52 again changes the state of the flip-flop to return its output to the high or zero level.

An inspection of Figs. 4*a* and 4*f* discloses that the output information pulse from the flip-flop is displaced by a half digit with respect to the signal from the clipping circuit. Thus, if the signal from the clipping circuit has been delayed 15.5 digits, this additional half-digit delay effects a total 16-digit delay for the signal initially applied to the oscillator 10 of Fig. 1.

Although specific delays of 15.5 and 0.5 digits have been described for the delay line and gates, it has been found that the gates can correct for variations in delays of ±0.5 digit. Such delays may be caused by variations in the repetition rate of the clock pulses, variations in delay due to inaccuracies arising from the effects of circuit components, temperature effects on the delay line, etc. It will be apparent that this automatic correction makes it possible to utilize delay lines which can be made without rigid tolerances, thus making it possible to make the register with considerable saving in economy compared to present registers.

It will be apparent that the register of this invention is not limited to the particular "and" gate circuit arrangements shown. Any suitable arrangement of other well known gates may be adapted to provide the type of operation herein described.

A register of the type herein described uses less than half the number of tube circuits employed in present voltage-state computer registers, and thus has much less space and power requirements than present registers.

What is claimed is:

In a voltage-state computer, a flip-flop circuit to produce an output signal pulse in response to input signals, an oscillator coupled to said flip-flop circuit and controlled by said flip-flop circuit between oscillating and non-oscillating conditions, an acoustic delay line directly coupled to said oscillator to receive energy therefrom, amplifying and detecting means coupled to said delay line to receive energy therefrom, said oscillator being responsive to the occurrence of said signal pulse to develop an output wave of a predetermined frequency substantially of the resonant frequency of said delay line and having a time duration corresponding to the duration of said signal pulses, said delay line being adapted to apply an oscillatory wave of said predetermined frequency to said amplifying and detecting means which has a predetermined delay with respect to the output wave from said oscillator, automatic gain control means coupled to said amplifying and detecting means, a clipping circuit coupled to said amplifying and detecting means, said clipping circuit being adapted to pass signals from said amplifying and detecting means which are below a predetermined magnitude, said automatic gain control circuit being operative during portions said signals which exceed said predetermined magnitude, an output flip-flop circuit, means coupled between said clipping circuit and said output flip-flop circuit and responsive to signals from said clipping circuit to cause said output flip-flop circuit to develop a signal pulse, said coupling means being adapted to effect operation of said output flip-flop circuit a predetermined total delay time with respect to the signal pulse applied to said oscillator.

(References on following page)

References Cited in the file of this patent

UNITED STATES PATENTS

| | | |
|---|---|---|
| 2,617,930 | Cutler | Nov. 11, 1952 |
| 2,750,499 | Newman | June 12, 1956 |
| 2,787,416 | Hansen | Apr. 2, 1957 |

OTHER REFERENCES

Auerbach: "Mercury Delay Line Memory Using a Pulse Rate of Several Megacycles," Proceedings of the I.R.E., vol. 37, No. 8, August 1949.

Quarterly Progress Report No. 9, Signal Corps Electronic Computer Research and Development (MSAC), University of Pa., Apr. 15, 1952.

Progress Report No. 2, Investigations for Design of Digital Calculating Machinery, Harvard University, December 6, 1952, pp. II–15 to II–18.